(12) United States Patent
Sato

(10) Patent No.: US 10,189,980 B2
(45) Date of Patent: Jan. 29, 2019

(54) PROCESS FOR PRODUCING THERMOPLASTIC RESIN COMPOSITION

(71) Applicant: The Yokohama Rubber Co., Ltd., Tokyo (JP)

(72) Inventor: Shun Sato, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 433 days.

(21) Appl. No.: 14/906,907

(22) PCT Filed: Jul. 25, 2014

(86) PCT No.: PCT/JP2014/069716
§ 371 (c)(1),
(2) Date: Jan. 22, 2016

(87) PCT Pub. No.: WO2015/012394
PCT Pub. Date: Jan. 29, 2015

(65) Prior Publication Data
US 2016/0160019 A1    Jun. 9, 2016

(30) Foreign Application Priority Data

Jul. 25, 2013   (JP) .................................. 2013-154715

(51) Int. Cl.
| | | |
|---|---|---|
| *C08L 23/26* | (2006.01) | |
| *F16L 11/04* | (2006.01) | |
| *B60C 1/00* | (2006.01) | |
| *C08L 23/08* | (2006.01) | |
| *C08L 51/06* | (2006.01) | |
| *C08L 77/00* | (2006.01) | |

(52) U.S. Cl.
CPC ............ *C08L 23/26* (2013.01); *B60C 1/0008* (2013.01); *C08L 23/0861* (2013.01); *C08L 51/06* (2013.01); *C08L 77/00* (2013.01); *F16L 11/04* (2013.01); *C08L 2205/03* (2013.01)

(58) Field of Classification Search
CPC .......... C08L 23/26; C08L 51/06; C08L 77/00; C08L 23/0861
See application file for complete search history.

(56) References Cited

U.S. PATENT DOCUMENTS

| | | | | |
|---|---|---|---|---|
| 2010/0108229 | A1* | 5/2010 | Hata | .......................... B60C 9/02 152/564 |
| 2010/0112257 | A1 | 5/2010 | Morooka | |
| 2010/0112258 | A1 | 5/2010 | Cruse et al. | |
| 2011/0028651 | A1 | 2/2011 | Kawaguchi et al. | |
| 2011/0305863 | A1 | 12/2011 | Morooka | |
| 2015/0045511 | A1* | 2/2015 | Tomoi | ........................ B29B 7/88 525/182 |

FOREIGN PATENT DOCUMENTS

| | | |
|---|---|---|
| CN | 101993577 A | 3/2011 |
| EP | 2290003 A2 | 3/2011 |
| EP | 2474570 A1 | 7/2012 |
| JP | 2004-331708 A | 11/2004 |
| JP | 2010-132850 A | 6/2010 |
| JP | 2011-032391 A | 2/2011 |
| JP | 2012-046622 A | 3/2012 |
| JP | 2012-072306 A | 4/2012 |

* cited by examiner

*Primary Examiner* — Peter D. Mulcahy
(74) *Attorney, Agent, or Firm* — Polsinelli PC

(57) ABSTRACT

A process for producing a thermoplastic resin composition in which the continuous phase comprises an ethylene/vinyl alcohol copolymer (A) and a polyamide resin (B) and the dispersed phase comprises an acid-modified polyolefin elastomer (C), the process being characterized by comprising: step (I) in which an ethylene/vinyl alcohol copolymer (A) and an acid-modified polyolefin elastomer (C) are kneaded to form a mixture in which the acid-modified polyolefin elastomer (C) has been dispersed in the ethylene/vinyl alcohol copolymer (A); step (II) in which a polyamide resin (B) is subsequently added to the mixture obtained in step (I), and the resultant mixture is further kneaded; and step (III) in which a terminal-blocking agent (D) for the polyamide resin (B) is subsequently added to the mixture obtained in step (II) in an amount of 0.1-5 parts by mass per 100 parts by mass of the polyamide resin (B), and the resultant mixture is melt-kneaded at a temperature not lower than the melting point of the polyamide resin (B).

17 Claims, No Drawings

PROCESS FOR PRODUCING THERMOPLASTIC RESIN COMPOSITION

CROSS REFERENCE TO RELATED APPLICATIONS

This application is a National Phase filing under 35 U.S.C. § 371 of PCT/JP2014/069716 filed on Jul. 25, 2014; and this application claims priority to Application No. 2013-154715 filed in Japan on Jul. 25, 2013 under 35 U.S.C. § 119. The entire contents of each application are hereby incorporated by reference.

TECHNICAL FIELD

The present invention relates to a process for producing a thermoplastic resin composition, and more particularly, a process for producing a thermoplastic resin composition having excellent processability with high productivity, a thermoplastic resin composition produced by the process, and an article in which the thermoplastic resin composition is used.

BACKGROUND ART

Thermoplastic resin compositions comprising a rubber dispersed in a polyamide resin as a thermoplastic resin have both gas barrier properties and flexibility, and thermoplastic resin compositions comprising as a thermoplastic resin ethylene-vinyl alcohol copolymer (EVOH) which is known to have particularly excellent gas barrier properties are useful as, for example, a film member of pneumatic tire such as, for example, an inner liner, in the production of a pneumatic tire and are also useful in the production of a hose. As a method for producing such a thermoplastic resin composition, Patent Literature 1, for example, proposed a method comprising melt-blending a polyamide resin with a compound capable of bonding to an end amino group of the polyamide resin at or above the melting point of the polyamide resin to obtain a modified polyamide resin, and then melt-mixing the resulting modified polyamide resin with a modified rubber and optionally an ethylene-vinyl alcohol copolymer, in order to maintain the flowability during melt-kneading and mixing even if a modified rubber is added at a high ratio. Further, Patent Literature 2 proposed a method for producing a thermoplastic resin composition, comprising (I) melt-kneading an acid anhydride-modified or epoxy-modified rubber with an ethylene-vinyl alcohol copolymer resin to prepare a first resin composition in which (A) acid anhydride-modified or epoxy-modified rubber is dispersed in the ethylene-vinyl alcohol copolymer resin, (II) crosslinking a crosslinkable elastomer while melt-kneading the crosslinkable elastomer with a polyamide resin to prepare a second resin composition in which crosslinked elastomer particles are dispersed in the polyamide resin, and (III) melt-mixing the first resin composition and the second resin composition.

CITATION LIST

Patent Documents

Patent Document 1: Japanese Unexamined Patent Publication No. 2010-132850

Patent Document 2: Japanese Unexamined Patent Publication No. 2012-57127

SUMMARY OF INVENTION

Technical Problem

However, in the above prior methods at least two stages including a melt-kneading step for obtaining an intermediate product from starting materials and a step of melt-kneading all materials are not consecutive, and therefore it has been demanded to simplify the kneading and mixing operations, thereby improving the productivity of a thermoplastic resin composition.

Solution to Problem

The present inventor has made intensive research with a view to solve the above problems, and as a result has found that the reaction between an acid-modified polyolefin elastomer and a polyamide resin can be suppressed by kneading an ethylene-vinyl alcohol copolymer and the acid-modified polyolefin elastomer to form a kneaded material in which the acid-modified polyolefin elastomer is dispersed in the ethylene-vinyl alcohol copolymer, subsequently adding a polyamide resin to the resulting kneaded material and further kneading them, and subsequently adding an end-capping agent for the polyamide resin in an amount of 0.1 to 5 parts by weight with respect to 100 parts by weight of the polyamide resin to the resulting kneaded material and melt-kneading them at or above the melting point of the polyamide resin, and also has found that the reaction of the end-capping agent for the polyamide resin with the end amino groups of the polyamide resin after the addition of the polyamide resin can prevent the acid-modified polyolefin elastomer and the polyamide resin from reacting with each other after kneading, and as a result it is possible to carry out the kneading consecutively in one stage without causing a decrease in the flowability of the kneaded material, and consequently have completed the present invention.

According to the present invention, a process for producing a thermoplastic resin composition having a continuous phase comprising (A) an ethylene-vinyl alcohol copolymer and (B) a polyamide resin and a dispersed phase comprising (C) an acid-modified polyolefin elastomer is provided, wherein the process comprising:

(I) kneading ethylene-vinyl alcohol copolymer (A) and acid-modified polyolefin elastomer (C) to form a kneaded material in which acid-modified polyolefin elastomer (C) is dispersed in ethylene-vinyl alcohol copolymer (A), subsequently, (II) adding polyamide resin (B) to the kneaded material obtained in step (I) and further kneading them, and subsequently, (III) adding an end-capping agent (D) for polyamide resin (B) in an amount of 0.1 to 5 parts by weight with respect to 100 parts by weight of polyamide resin (B) to a kneaded material obtained in step (II) and melt-kneading them at or above the melting point of polyamide resin (B).

The thermoplastic resin composition produced by the above process of the present invention exhibits excellent properties, such as good gas barrier properties, flexibility, processability, etc., and therefore is useful in various applications (for example, pneumatic tires, hoses (for example, gas or fluid transport hoses), ship fenders, rubber bags, fuel tanks, etc.) that require such properties. According to the present invention, various manufactured articles produced using a thermoplastic resin composition produced by the above process, for example, manufactured articles such as a pneumatic tire in which a film composed of the thermoplastic resin composition of the present invention is used in an inner liner, a hose in which a film composed of the thermoplastic resin composition of the present invention is used in a gas barrier layer, etc., are also provided.

Effects of the Invention

According to the present invention, a thermoplastic resin composition can be produced by one stage consecutive kneading operation without causing a decrease in the flowability of the kneaded material. Further, according to the present invention, it is possible to suppress gel particles from being generated in the kneaded material. Therefore, according to the process of the present invention, it is possible to produce a thermoplastic resin composition having good kneadability, extrusion properties, film-forming properties, and appearance with high productivity.

DESCRIPTION OF EMBODIMENTS

As described above, the process for producing a thermoplastic resin composition of the present invention enables the production of a thermoplastic resin composition by a kneading operation comprising (I) kneading ethylene-vinyl alcohol copolymer (A) and acid-modified polyolefin elastomer (C) to form a kneaded material in which acid-modified polyolefin elastomer (C) is dispersed in ethylene-vinyl alcohol copolymer (A), subsequently (II) adding polyamide resin (B) to the kneaded material obtained in step (I) and further kneading them, and subsequently (III) adding end-capping agent (D) for polyamide resin (B) in an amount of 0.1 to 5 parts by weight with respect to 100 parts by weight of polyamide resin (B) to the kneaded material obtained in step (II) and melt-kneading them at or above the melting point of polyamide resin (B).

Step (I) in the process of the present invention is a step of forming a kneaded material by kneading ethylene-vinyl alcohol copolymer (A) and acid-modified polyolefin elastomer (C) to form a kneaded material in which acid-modified polyolefin elastomer (C) is dispersed in ethylene-vinyl alcohol copolymer (A). Although a kneaded material in which acid-modified polyolefin elastomer (C) is dispersed in ethylene-vinyl alcohol copolymer (A) is formed by this step, it is assumed that, since ethylene-vinyl alcohol copolymer (A) and acid-modified polyolefin elastomer (C) react with each other during kneading, an excessive reaction between the polyamide resin which will be added in the next step (II) and acid-modified polyolefin elastomer (C), leading the reduction in flowability, is suppressed. In step (I), the lower limit of the kneading temperature during kneading ethylene-vinyl alcohol copolymer (A) and acid-modified polyolefin elastomer (C) may be equal to or above the melting point of at least ethylene-vinyl alcohol copolymer (A), is preferably higher by 10° C. or more than the melting point of ethylene-vinyl alcohol copolymer (A), and is typically about 160° C. to about 230° C. The kneading time varies depending on the kneading apparatus used, the amounts of ethylene-vinyl alcohol copolymer (A) and acid-modified polyolefin elastomer (C), the kneading temperature, etc., and the kneading time is typically from 1 to 8 minutes, and preferably from 2 to 6 minutes.

As described above, step (II) is a step of adding polyamide resin (B) to the kneaded material obtained in step (I) and further kneading them. The lower limit of the kneading temperature in step (II) may be equal to or above the higher one of the melting points of ethylene-vinyl alcohol copolymer (A) and polyamide resin (B), and is preferably higher by 10° C. or more than the melting point which is the higher one of the melting points of ethylene-vinyl alcohol copolymer (A) and polyamide resin (B), and is typically about 190° C. to about 250° C. The kneading time varies depending on the kneading apparatus used, the amounts of ethylene-vinyl alcohol copolymer (A), polyamide resin (B), and acid-modified polyolefin elastomer (C), the kneading temperature, etc., and the kneading time is typically from 30 seconds to 4 minutes, and preferably 1 to 3 minutes.

In step (III), end-capping agent (D) for polyamide resin (B) is added to the kneaded material and is kneaded at a temperature which is equal to or above the melting point of at least polyamide resin (B) and which is a temperature at which polyamide resin (B) and compound (B) react with each other. Consequently, at least one end amino group of the polyamide resin is capped with end-capping agent (D), resulting in the suppression of the reaction of EVOH (A) and polyamide resin (B) with acid-modified polyolefin elastomer (C) after this step. The kneading time varies depending on the kneading apparatus used, the amounts of ethylene-vinyl alcohol copolymer (A), polyamide resin (B), acid-modified polyolefin elastomer (C), and end-capping agent (D), the kneading temperature, etc., and the kneading time is typically from 30 seconds to 3 minutes. If this step is carried out using, for example, a twin-screw kneading extruder, this step can be carried out by melt-kneading EVOH (A), polyamide resin (B), and acid-modified polyolefin elastomer (C) introduced through the feeding ports located upstream in the extruding direction of the twin-screw kneading extruder with end-capping agent (D) in a kneading zone set at a temperature which is equal to or higher than the melting point of at least polyamide resin (B).

Optionally, by introducing crosslinking agent (E) in the cylinder of the twin-screw kneading extruder through the first, second, and/or third feeding ports, acid-modified polyolefin elastomer (C) may be dynamically crosslinked in at least one step among steps (I), (II) and (III) and after the introduction of crosslinking agent (E). Further, crosslinking agent (E) may be introduced in the cylinder of the twin-screw kneading extruder through a feeding port provided between the first and second feeding ports or a feeding port provided between the second and third feeding ports, and dynamic crosslinking may be carried out by melt-kneading through at least one kneading zone within the twin-screw kneading extruder. The rubbery elasticity of the acid-modified polyolefin elastomer is improved by the dynamic crosslinking, thereby improving the fatigue durability of the thermoplastic resin composition.

Ethylene-vinyl alcohol copolymer (EVOH) used as component (A) in the process for producing a thermoplastic resin composition according to the present invention is a copolymer composed of ethylene units (—CH$_2$CH$_2$—) and vinyl alcohol units (—CH$_2$—CH(OH)—), and in addition to the ethylene units and the vinyl alcohol units, it may contain other constituent units to the extent that the effects of the present invention are not impaired. The ethylene-vinyl alcohol copolymer has an ethylene unit content, namely an ethylene content, of preferably 5 to 55 mol %, and more preferably 20 to 50 mol %. Too low an ethylene content of the ethylene-vinyl alcohol copolymer will result in insufficient fatigue durability, and conversely, too high an ethylene content will result in the reduction in barrier properties. The ethylene-vinyl alcohol copolymer is a saponified product of an ethylene-vinyl acetate copolymer, and the saponification degree thereof is preferably 90% or higher, and more preferably 991 or higher. Too low a saponification degree of the ethylene-vinyl alcohol copolymer will result in the reduction in air barrier properties and thermal stability. Ethylene-vinyl alcohol copolymers are commercially available, and are available under, for example, the trade name of Soarnol™ from The Nippon Synthetic Chemical Industry Co., Ltd. and under the trade name of Eval™ from Kuraray Co., Ltd. Examples of ethylene-vinyl alcohol copolymers having an ethylene content of 5 to 55 mol % include Soarnol™ H4815B (ethylene content of 48 mol %), Soarnol™ A4412B (ethylene content of 42 mol %), Soarnol™ DC3212B (ethylene unit content of 32 mol %), and Soarnol™ V2504RB (ethylene content of 25 mol %) from The Nippon Synthetic Chemical Industry Co., Ltd., and Eval™ L171B (ethylene content of 27 mol %), Eval™ H171B (ethylene content of 38 mol %), and Eval™ E171B (ethylene content of 44 mol %) from Kuraray Co., Ltd.

Examples of the polyamide resin used as component (B) in the process for producing a thermoplastic resin composition according to the present invention include, for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon 6, Nylon 6T, Nylon 6/6T copolymer, Nylon 66/PP copolymer, and Nylon 66/PPS copolymer. Among these polyamide resins, Nylon 6, Nylon 66, Nylon 6/66 copolymer, Nylon 11, Nylon 12, and Nylon MXD6 are preferably used, in view of processability and durability. One of the above polyamide resins may be used, or two or more of the above polyamide resins may be used in combination.

The amount of polyamide resin (B) is preferably such a level that the weight ratio of EVOH (A) to polyamide resin (B) is preferably from 35:65 to 80:20. If EVOH (A) is present in an amount smaller than 35:65 with respect to polyamide resin (B), it is difficult to sufficiently achieve the improving effect in gas barrier properties by EVOH. Meanwhile, EVOH generally has properties of hard and brittle due to the formation of intermolecular hydrogen bonds, and accordingly, if the amount of EVOH (A) is too much with respect to polyamide resin (B), gas barrier properties will be reduced due to fatigue caused by repeated bending and deformation.

The acid-modified polyolefin elastomer (component (C)) which forms a dispersed phase is a polyolefin elastomer having a carboxyl group or acid anhydride group at a side chain and/or end of molecule. Acid-modified polyolefin elastomer (C) exhibits compatibility with EVOH (A), and is capable of being dispersed in EVOH (A). Examples of the acid anhydride group which may be present in acid-modified polyolefin elastomer (C) include, for example, maleic anhydride group. Acid-modified polyolefin elastomer (C) can be produced according to a well-known method. For example, acid-modified polyolefin elastomer (C) can be produced by reacting an acid anhydride and a peroxide with a rubber. Preferred examples of acid-modified polyolefin elastomer (C) include ethylene-α-olefin copolymers and acid anhydride-modified products of the derivatives thereof (for example, acid anhydride-modified products of ethylene-propylene copolymer, acid anhydride-modified products of ethylene-butene copolymer, acid anhydride-modified ethylene-octene). One of the above acid-modified polyolefin elastomers may be used, or two or more of the above acid-modified polyolefin elastomers may be used in combination. Examples of commercially available acid-modified polyolefin elastomers include Tafmer® MH 7010 (maleic anhydride-modified ethylene-butene copolymer) and Tafmer® MH7020 (maleic anhydride-modified ethylene-butene copolymer) manufactured by Mitsui Chemicals, Inc.

Acid-modified polyolefin elastomer (C) is 100 to 240 parts by weight, and preferably 120 to 200 parts by weight, with respect to 100 parts by weight of the total of EVOH (A) and polyamide resin (B). If the proportion of the acid-modified polyolefin elastomer (C) to the total amount of EVOH (A) and polyamide resin (B) is too low, sufficient durability cannot be achieved, and if the proportion of the acid-modified polyolefin elastomer (C) to the total amount of EVOH (A) and polyamide resin (B) is too high, acid-modified polyolefin elastomer (C) forms a continuous phase, and consequently desired thermoplastic resin composition cannot be obtained.

End-capping agent (component (D)) for polyamide resin (B) includes monofunctional epoxy compounds, isocyanate group-containing compounds, acid anhydride group-containing compounds, halogenated alkyl group-containing compounds, etc., and monofunctional epoxy compounds are preferred as compound (D) in view of the reactivity with the end amino groups of polyamide resin (B).

Examples of the monofunctional epoxy compound include ethylene oxide, epoxypropane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4- heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epxoycyclononane, 1,2-epoxycyclodecane, 1,2-epoxycyclododecane, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecane, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether, p-sec-butylphenyl glycidyl ether, etc., and epoxy compounds having 3 to 20 carbon atoms, preferably from 3 to 13 carbon atoms, and having an ether and/or hydroxyl group are preferred in view of the compatibility of the polyamide resin.

The amount of end-capping agent (D) is 0.1 to 5 parts by weight, and preferably 1 to 3 parts by weight with respect to 100 parts by weight of polyamide resin (B). Too low an amount of end-capping agent (D) with respect to polyamide resin (B) will result in a small effect in improving flowability when acid-modified polyolefin elastomer (C) is added at a high ratio, and therefore is not preferred. Conversely, too much an amount of end-capping agent (D) will result in the reduction in the low temperature durability (repeated fatigue properties) of the polyamide resin, and therefore is not preferred.

Crosslinking agent (E) which may be used in the production of the thermoplastic resin composition includes amine compounds, peroxide compounds, compounds having a hydroxyl group, etc., and among them polyfunctional amine compounds and highly hydrogen bonding compounds are preferred. Polyfunctional amine compounds include 3,3'-diaminodiphenylsulfone, 4,4'-diaminodiphenylsulfone, N-(1,3-dimethylbutyl)-N'-phenyl-p-phenylenediamine, m-phenylenediamine, 1,3-bis(3-aminophenoxy)benzene, etc., and among them 3,3'-diaminodiphenylsulfone and tris-(2-hydroxyethyl)isocyanurate are preferred in view of costs, safety, and improvement in low temperature durability. The amount of the crosslinking agent is typically 0.1 to 5 parts by weight, and more preferably 0.5 to 3 parts by weight, with respect to 100 parts by weight of acid-modified polyolefin elastomer (C). Too low an amount of the crosslinking agent will result in the reduction in fatigue durability. Conversely, too much an amount of the crosslinking agent will cause scorching during kneading and processing or appearance defects, such as fisheye, after processing into a film, etc.

In the process for producing the thermoplastic resin composition of the present invention, when EVOH (A), polyamide resin (B), acid-modified polyolefin elastomer (C), and end-capping agent (D) for polyamide resin (B) are compounded, common ingredients for common resins and rubbers, such as fillers, reinforcing agents, processing aids, compatibilizers, stabilizers, antioxidants, anti-aging agents, etc., may optionally be added to improve properties such as reinforcing properties, processability, dispersibility, heat resistance, anti-oxidative properties, etc., insofar as the effects of the present invention are not impaired. The amounts of these ingredients may be conventional common amounts, unless contrary to the object of the present invention. Further, these ingredients may be preliminarily added to at least one of EVOH (A), polyamide resin (B), and acid-modified polyolefin elastomer (C), as necessary, unless contrary to the object of the present invention.

The thermoplastic resin composition of the present invention can be produced by melt-kneading the above essential components and optional ingredients using a kneader which is commonly used in the production of a thermoplastic resin composition, such as kneader, Banbury mixer, single-screw kneading extruder, twin-screw kneading extruder, etc. Melt-kneading is preferably carried out using a twin-screw kneading extruder, in view of the high productivity thereof. A person with ordinary skill in the art can select the kneading condition depending on the types and amounts of the essential components and optional ingredients used.

When the process for producing a thermoplastic resin composition according to the present invention is carried out using a twin-screw kneading extruder, the twin-screw kneading extruder comprises:

a first feeding port for feeding ethylene-vinyl alcohol copolymer (A) and acid-modified polyolefin elastomer (C) into a cylinder, the first feeding port being located upstream in the extrusion direction;

a first kneading zone for kneading ethylene-vinyl alcohol copolymer (A) and acid-modified polyolefin elastomer (C) to form a kneaded material in which acid-modified polyolefin elastomer (C) is dispersed in ethylene-vinyl alcohol copolymer (A);

a second feeding port for feeding polyamide resin (B) into the cylinder, the second feeding port being located downstream of the first kneading zone in the extrusion direction;

a second kneading zone for kneading the kneaded material conveyed from the first kneading zone with polyamide resin (B);

a third feeding port for feeding end-capping agent (D) for polyamide resin (B) into the cylinder, the third feeding port being located downstream of the first kneading zone in the extrusion direction; and a third kneading zone for melt-kneading the kneaded material conveyed from the second kneading zone with end-capping agent (D);

and steps (I) to (III) in the process of the present invention can be carried out in the above first, second and third kneading zones. A conveyance zone may be present between the first and second kneading zones and/or between the second and third kneading zones.

The total of the lengths of the kneading zones is preferably from 15 to 40% of the screw length. A total of the lengths of the kneading zones of less than 15% of the screw length may lead insufficient kneading, thereby rendering the achievement of sufficient durability and extrusion moldability difficult. Further, a total of the lengths of the kneading zones of more than 40% of the screw length may lead excessive kneading of ethylene-vinyl alcohol copolymer (A), polyamide resin (B), and acid-modified polyolefin elastomer (C), and consequently causing the generation of gel particles and a reduction in flowability, thereby rendering processability insufficient. The length of each kneading zone is preferably 10% or less of the screw length to prevent excessive heating in the kneading zones. However, too short total length of the kneading zones leads insufficient kneading, and accordingly acid-modified polyolefin elastomer (C) will not be finely dispersed in a matrix phase. Therefore, kneading is preferably carry out in stepwise while suppressing local heat generation, and kneading zones are preferably provided at four or more positions. Further, in view of suppressing gel particles and the reduction in flowability due to excessive reaction between ethylene-vinyl alcohol copolymer (A) and acid-modified polyolefin elastomer (C) in the first kneading zone, the cylinder temperature at the first feeding port through which ethylene-vinyl alcohol copolymer (A) is introduced in the extruder is preferably lower by 40° C. or more than the cylinder temperature at the position of the second feeding port through which polyamide resin (B) is charged.

For example, the resulting melt-kneaded material may be extruded from a die attached to the outlet port of a twin-screw kneading extruder into a form of film, sheet, tube, etc., or may be extruded into a strand form, and pelletized with a resin pelletizer, and subsequently the resulting pellets are formed into a desired form, such as a form of film, sheet, tube, etc., depending on the application, using a common resin forming technique such as inflation forming, calendar forming, extrusion forming, etc.

A pneumatic tire can be produced using as an inner liner a film formed using the thermoplastic resin composition obtained by the above production process of the present invention. As a method for producing a pneumatic tire, any conventional method may be used. For example, the thermoplastic resin composition of the present invention is extruded into a form of film having a predetermined width and thickness, and the resulting film is laminated onto a tire molding drum in cylindrical form. Then, members that are used in conventional tire members such as a carcass layer, a belt layer, a tread layer, etc., are sequentially laminated thereon, and the resulting green tire is removed from the drum. Then, the green tire is vulcanized in accordance with a conventional technique to produce a desired pneumatic tire.

The thermoplastic resin composition obtained by the above production process of the present invention can also be used in producing a hose. Any conventional method may be used for producing a hose using the thermoplastic resin composition of the present invention. For example, a hose can be produced by the following manner. First, by using the pellets of the thermoplastic resin composition, the thermoplastic resin composition is extruded on a mandrel with a resin extruder in a crosshead extrusion manner to form an inner tube. Further, another thermoplastic resin composition of the present invention or a common thermoplastic rubber composition may be extruded on the inner tube to form an inner tube outer layer. Then, if needed, an adhesive is applied onto the inner tube by coating, spraying, etc. Further, reinforcing yarns or reinforcing steel wires are braided on the inner tube using a braiding machine. If needed, another adhesive is applied onto the resulting reinforcing layer to adhere the reinforcing layer with an outer tube, and subsequently, the thermoplastic resin composition of the present invention or other common thermoplastic rubber composition is extruded with a crosshead resin extruder in the same manner to form an outer tube. Finally, the mandrel is withdrawn to obtain a hose. The adhesive which can be applied onto the inner tube or on the reinforcing layer includes isocyanate-based, urethane-based, phenol resin-based, resorcin-based, chlorinated rubber-based, and HRH-based adhesives, and isocyanate-based and urethane-based adhesives are particularly preferred.

EXAMPLES

The present invention will be further explained with reference to the following examples and comparative examples, and it should be understood that the scope of the present invention is not limited by these examples.

Comparative Examples 1 to 3 and Examples 1 to 8

Production of Thermoplastic Resin Compositions

An EVOH resin and an acid-modified polyolefin elastomer were introduced in a cylinder through the first feeding port located upstream of the first kneading zone of a twin-screw kneading extruder (manufactured by The Japan Steel Works, Ltd.), a polyamide resin was introduced in the cylinder through the second feeding port located between the first and second kneading zones, an end-capping agent for the polyamide resin was introduced in the cylinder through the third feeding port located between the second and third kneading zones, and a crosslinking agent was introduced in the cylinder through the fourth feeding port located between the first and second feeding ports, at the parts by weight shown in Table 1, respectively, and then were conveyed to the kneading zones set at a retention time of about 2 to 8 minutes to melt-knead them, and the resulting melt-kneaded material was extruded from a die attached to an outlet port into a strand form. The resulting extrudate in the form of strand was pelletized with a resin pelletizer to obtain a thermoplastic resin composition in the form of pellets.

TABLE 1

Formulations of Thermoplastic Resin Compositions (parts by weight)

| | Com. Ex. 1 | Com. Ex. 2 | Com. Ex. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| EVOH resin [1] | 70 | 70 | 70 | 70 | 70 | — | 55 | 45 | 30 | 70 | 70 |
| EVOH resin [2] | — | — | — | — | — | 70 | — | — | — | — | — |
| Polyamide resin [3] | 15 | — | 15 | 15 | 15 | 15 | 25 | 30 | 10 | 15 | 15 |
| Polyamide resin [4] | 15 | — | 15 | 15 | 15 | 15 | 20 | 25 | 10 | 15 | — |
| Polyamide resin [5] | — | — | — | — | — | — | — | — | — | — | 15 |
| End-capping agent [6] | — | — | — | 0.9 | 0.9 | 0.9 | 1.4 | 1.7 | 0.6 | 0.9 | 0.9 |
| Modified polyamide resin [7] | — | 30.9 | — | — | — | — | — | — | — | — | — |
| Acid-modified polyolefin [8] | 130 | 130 | 130 | 130 | 120 | 130 | 120 | 120 | 170 | 90 | 130 |
| Acid-modified polyolefin [9] | — | — | — | — | — | — | — | — | — | 30 | — |
| Crosslinking agent [10] | 1 | 1 | 1 | 1 | — | 1 | 1 | 1 | 2 | 1 | 1 |

Footnote of Table 1:
[1] Ethylene-vinyl alcohol copolymer (Soarnol H4815B manufactured by The Nippon Synthetic Chemical Industries Co., Ltd., ethylene content 48 mol %)
[2] Ethylene-vinyl alcohol copolymer (Soarnol DC3212B manufactured by The Nippon Synthetic Chemical Industries Co., Ltd., ethylene content 32 mol %)
[3] Nylon 6 (UBE Nylon 1013B manufactured by Ube Industries, Ltd.)
[4] Nylon 6-12 (UBE Nylon 7024B manufactured by Ube Industries, Ltd.)
[5] Nylon 6-66 (UBE Nylon 5023B manufactured by Ube Industries, Ltd.)
[6] p-sec-butylphenyl-glycidylether (Epiol SB manufactured by Nippon Oil & Fat Co., Ltd.)
[7] Nylon 6 (UBE Nylon 1013B) modified with p-sec-butylphenyl-glycidylether (Epiol SB), prepared by twin-screw kneading in advance
[8] Maleic anhydride-modified ethylene-butene copolymer (Tafmer ® MH7020 manufactured by Mitsui Chemicals, Inc.)
[9] Maleic anhydride-modified ethylene-butene copolymer (Tafmer ® MH7010 manufactured by Mitsui Chemicals, Inc.)
[10] Tris-(2-hydroxyethyl)isocyanurate (THEIC A manufactured by Shikoku Chemicals Corporation)

Evaluation Methods and Results

The thermoplastic resin compositions of Comparative Examples 1 to 3 and Examples 1 to 8 produced as described above were evaluated for twin-screw kneading properties by observing the strand extruded from the outlet port of the twin-screw kneading extruder in the production thereof, as described below. Further, the strand extruded from the outlet port was pelletized with a resin pelletizer, and then was formed into a film, and the resulting film was evaluated for film-forming properties by observing the presence or absence of gel particles therein.

Twin-Screw Kneading Properties

After 30 minutes from the charging of the starting materials, the strand extruded from the outlet port was observed, and when two or more gel particles having a size of 7 mm or more were observed in a strand having a length of 3 m, that strand was determined as "gel particles present", and when one or less than one gel particle was observed, that strand was determined as "gel particles absent".

T-Die Casting Film-Forming Properties

The thermoplastic resin compositions in the form of pellets were formed into a film having an average thickness of 0.1 mm using a 40 mm φ single-screw extruder having a 550 mm width T-die (manufactured by Pla Giken Co. Ltd.) under extrusion conditions of extrusion temperatures of C1/C2/C3/C4/die=200/210/220/230/230° C., a cooling roll temperature of 50° C., and a taking-up speed of 3 m/min. The film formation was carried out for 70 minutes for the composition of each example, and the appearance of the film was observed 30 minutes after the starting of the extrusion molding. The film-forming properties were determined by rating a film having a length of 2 m (and a width of a molding width) to be defective, tolerable, or good, when ten or more, 3 to 9, or 2 or less gel particles having a size of 3 mm×3 mm or more were observed in the film, respectively.

The evaluation results of the twin-screw kneading properties and film-forming properties will be shown in Table 2 below.

TABLE 2

Evaluation Results on Processability

| | Com. Ex. 1 | Com. Ex. 2 | Com. Ex. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Presence or absence of gel particles | Present | Absent | Absent | Absent | Absent | Absent | Absent | Absent | Absent | Absent | Absent |
| T-die casting film-forming properties | Defective | Good | Defective | Good | Good | Good | Good | Good | Good | Good | Good |

The above evaluation results show that the thermoplastic resin compositions of Examples 1 to 8 have excellent twin-screw kneading properties and T-die casting film-forming properties, and therefore have excellent processability. Further, since Examples 1 to 8 show that the process for producing a thermoplastic resin composition according to the present invention provides a thermoplastic resin composition having excellent processability by one consecutive kneading operation, the above results show that the process for producing a thermoplastic resin composition according to the present invention provides a high productivity.

INDUSTRIAL APPLICABILITY

The thermoplastic resin composition of the present invention, which is processed into, for example, a form of film, can be suitably used as an inner liner for pneumatic tire, and in addition to pneumatic tire, is also useful as a barrier material for rubber laminates such as hoses, ship fenders, rubber bags, fuel tanks, etc., that require gas barrier properties.

The invention claimed is:

1. A process for producing a thermoplastic resin composition having a continuous phase comprising (A) an ethylene-vinyl alcohol copolymer and (B) a polyamide resin (B) and a dispersed phase comprising (C) an acid-modified polyolefin elastomer, wherein the process comprising:
   (I) kneading the ethylene-vinyl alcohol copolymer (A) and the acid-modified polyolefin elastomer (C) to form a kneaded material in which the acid-modified polyolefin elastomer (C) is dispersed in the ethylene-vinyl alcohol copolymer (A), subsequently,
   (II) adding the polyamide resin (B) to the kneaded material obtained in step (I) and further kneading them, and subsequently,
   (III) adding an end-capping agent (D) for the polyamide resin (B) in an amount of 0.1 to 5 parts by weight based on 100 parts by weight of the polyamide resin (B) to a kneaded material obtained in step (II) and melt-kneading them at or above the melting point of the polyamide resin (B).

2. The process for producing a thermoplastic resin composition according to claim 1, using a twin screw kneader having at least three feeding ports including a first feeding port provided at the most upstream of a cylinder, a second feeding port provided downstream from the first feeding port, a third feeding port provided downstream from the second feeding port, thereby feeding the ethylene-vinyl alcohol copolymer (A) and the acid-modified polyolefin elastomer (C) to the first feeding port, feeding the polyamide resin (B) to the second feeding port, and feeding the end-capping agent (D) to the third feeding port.

3. The process for producing a thermoplastic resin composition according to claim 1, wherein the weight ratio of the ethylene-vinyl alcohol copolymer (A) to the polyamide resin (B) is from 35:65 to 80:20.

4. The process for producing a thermoplastic resin composition according to claim 1, wherein the acid-modified polyolefin elastomer (C) is from 100 to 240 parts by weight with respect to 100 parts by weight of the total of the ethylene-vinyl alcohol copolymer (A) to the polyamide resin (B).

5. The process for producing a thermoplastic resin composition according to claim 1, wherein the end-capping agent is a mono-functional epoxy compound.

6. The process for producing a thermoplastic resin composition according to claim 1, wherein the acid-modified polyolefin elastomer (C) is dynamically crosslinked in the presence of a cross-linking agent (E).

7. The process for producing a thermoplastic resin composition according to claim 1, wherein the ethylene-vinyl alcohol copolymer (A) has an ethylene content of from 25 to 50 mol % and a saponification degree of 90% or higher.

8. The process for producing a thermoplastic resin composition according to claim 1, wherein the acid-modified polyolefin elastomer (C) is selected from maleic anhydride-modified ethylene-propylene copolymer, maleic anhydride-modified ethylene-butene copolymer, maleic anhydride-modified ethylene-octene copolymer, and maleic anhydride-modified ethylene-hexene copolymer.

9. The process for producing a thermoplastic resin composition according to claim 1, wherein the polyamide resin (B) is at least one selected from Nylon 11, Nylon 12, Nylon 6, Nylon 66, Nylon 6/66, Nylon 6/12, Nylon 6/10, Nylon 4/6, Nylon 6/66/12, and aromatic nylons.

10. The process for producing a thermoplastic resin composition according to claim 2, wherein the weight ratio of the ethylene-vinyl alcohol copolymer (A) to the polyamide resin (B) is from 35:65 to 80:20.

11. The process for producing a thermoplastic resin composition according to claim 2, wherein the acid-modified polyolefin elastomer (C) is from 100 to 240 parts by weight with respect to 100 parts by weight of the total of the ethylene-vinyl alcohol copolymer (A) to the polyamide resin (B).

12. The process for producing a thermoplastic resin composition according to claim 3, wherein the acid-modified polyolefin elastomer (C) is from 100 to 240 parts by weight with respect to 100 parts by weight of the total of the ethylene-vinyl alcohol copolymer (A) to the polyamide resin (3).

13. The process for producing a thermoplastic resin composition according to claim 2, wherein the end-capping agent is a mono-functional epoxy compound.

14. The process for producing a thermoplastic resin composition according to claim 3, wherein the end-capping agent is a mono-functional epoxy compound.

15. The process for producing a thermoplastic resin composition according to claim 4, wherein the end-capping agent is a mono-functional epoxy compound.

16. The process for producing a thermoplastic resin composition according to claim 2, wherein the acid-modified polyolefin elastomer (C) is dynamically crosslinked in the presence of a cross-linking agent (E).

17. The process for producing a thermoplastic resin composition according to claim 3, wherein the acid-modified polyolefin elastomer (C) is dynamically crosslinked in the presence of a cross-linking agent (E).

* * * * *